United States Patent Office 3,704,204
Patented Nov. 28, 1972

3,704,204
TEST MEDIUM AND METHOD FOR THE
DETECTION OF SALMONELLA
Joseph G. Heck, Lombard, and Warner M. Hill, Downers Grove, Ill., assignors to Armour and Company, Chicago, Ill.
No Drawing. Filed Mar. 23, 1970, Ser. No. 22,002
Int. Cl. C12k 1/10
U.S. Cl. 195—100                                    10 Claims

ABSTRACT OF THE DISCLOSURE

A test medium and method for the rapid detection of salmonellae wherein the medium provides a source of nutrients for Salmonella organisms, a fermentable carbohydrate, a substrate for the production of hydrogen sulfide gas, and selective microorganism inhibitors. Means are provided for the detection of acid production and hydrogen sulfide. A sample incubated in the medium may be declared Salmonella free after approximately 24 hours.

BACKGROUND OF THE INVENTION

Salmonella is properly the name of a genus of aerobic gram-negative bacteria of the family Enterobacteriaceae, generally associated with acute inflammations in the intestines of animals including man. These organisms may be found in a variety of foods, and their pathogenic nature causes them to be a major concern to the food industry.

Although various procedures and methods are known to the food industry which are designed to produce Salmonella-free products, they do not eliminate the requirement for constant monitoring and testing for the possible presence of viable salmonella. Unfortunately, the known methods for testing for the presence or absence of Salmonella organisms are somewhat tedious, complex and time-consuming, often requiring three to five days to complete.

While conventional methods for Salmonella detection vary somewhat as to precise procedures and materials used, most methods require at least four distinct steps. The first step is usually pre-enrichment during which the sample is incubated for 20–24 hours in a non-selective broth medium such as lactose broth and nutrient broth. This allows essentially all of the organisms present to multiply. Secondly, an aliquot portion of the pre-enrichment broth is transferred to a selective broth medium, such as selenite cystine and tetrathionate broths, and incubated for 18–24 hours. This allows the salmonellae to proliferate while suppressing growth of other organisms. Thirdly, a very small amount of the selective broth is streaked on the surface of a solid medium which is selective for salmonellae and/or in some manner indicates the development of Salmonella colonies, such as brilliant green agar and bismuth sulfite agar. The plates are then incubated for an additional 20–24 hours. Last is the identification step which may of itself require two sub-steps. In this process, suspicious colonies from the streaked plates are transferred to a non-selective medium formulated to indicate a variety of reactions common to the Salmonella group, such as triple sugar iron agar. After an additional 20–24 hour incubation period, those bacterial growths showing typical reactions are subjected to biochemical or serological tests for the confirmation of Salmonella.

In the foods industry, the time necessary to make a positive determination of the presence of salmonellae is often burdensome and sometimes unacceptable. Moreover, the real commercial requirement is often not the positive identification of Salmonella, but rather the requirement is for a trustworthy negative identification, that is, a reliable indication that the sample is Salmonella-free.

SUMMARY OF THE INVENTION

It is an object of the present invention therefore to provide a test medium and method that will yield an accurate indication that a sample is free of Salmonella.

It is a further object of the present invention to provide a test medium and method for the detection of Salmonella which can be performed easily and rapidly to provide a Salmonella-free indication in about 24 hours.

Other objects and advantages of the invention will become apparent as the specification proceeds.

The present invention provides a test medium having a source of nutrients for Salmonella organisms, a fermentable carbohydrate, an acid indicator, a substrate for the production of hydrogen sulfide gas, and selective microorganism inhibitors. A sample may be placed in the medium and a swab impregnated with lead acetate may be placed just above the medium. After incubation for about 24 hours, a color change in the medium, indicating acid production, and a blackening of the swab, caused by hydrogen sulfide production, are indicative of Salmonella growth. If neither of these reactions occur, the sample is deemed free of Salmonella.

DESCRIPTION OF PREFERRED EMBODIMENTS

The medium of the present invention is preferably an aqueous solution containing nutrients for Salmonella organisms, a fermentable carbohydrate, a pH indicator, a substrate for the production of hydrogen sulfide gas, and selective inhibitors. A buffering agent may also be added. While the particular ingredients utilized to perform each of the enumerated functions may be varied within limits, the ingredients must be capable of functioning within the combined medium without interfering with the function of any of the other ingredients.

As a source of nutrients for Salmonella organisms we prefer to use phenol red broth. The broth is normally prepared from phenol red, beef extract, protease peptone, and sodium chloride in aqueous solution. The phenol red broth may be present in concentrations of about 1.02–2.5% by weight, and preferably about 2.0%. The phenol red broth serves a dual function as a nutrient source and as a pH indicator capable of signaling the subsequent production of acid, as will be more fully explained as the specification proceeds. If desired, yeast extract may be added in concentrations of about 0.3–0.7% as an additional source of nutrients.

Various fermentable carbohydrates which are assimilable by Salmonella organisms to produce acid may be used in the medium, but we prefer to use mannitol and particularly D-mannitol. The use of D-mannitol is preferable because although it is readily assimilable by salmonellae, it is not affected by certain other microorganisms which are commonly found in association with Salmonella such as many species of Proteus. The D-mannitol is preferably added in a concentration of about 0.5–1.0% by weight.

We prefer to add sodium thiosulfate in a concentration of about 0.03–0.07% by weight as a substrate for hydrogen sulfide production, the production of hydrogen sulfide being one of the positive indications of the presence of salmonellae.

The use of selective inhibitory agents is essential to the formulation of a medium which is to indicate the presence or absence of salmonellae to the exclusion of other microorganisms. These agents should prevent or substantially reduce the growth of most microorganisms while being ineffective or only mildly effective in preventing the development of salmonellae.

To the medium, we add about 0.3–1.0% by weight of bile salts to inhibit the growth of Gram positive and spore-forming bacteria. To assist in this function, about 0.1–0.5% of sodium deoxycholate may be added if desired.

We add two additional selective inhibiting agents. These are lithium chloride, added in amounts of about 0.1–0.5% by weight, and an acridine derivative such as acriflavin (3,6 - diaminoacridine-10-methochloride-hydrochloride). The acriflavin has been found to be effective in relatively small concentrations, and we prefer to add it in amounts of about 0.001–0.005% by weight of the solution.

For optimum results, we find that it is desirable to also raise the initial pH of the medium somewhat and to provide some buffering. To accomplish this, we may add a dibasic alkali metal phosphate, such as sodium or potassium phosphate in a concentration of about 0.3–0.4%.

The medium is preferably prepared in aqueous solution. If desired, the dry ingredients may be contained in gelatin capsules and the appropriate number of capsules added to distilled water to obtain the desired concentration of the aqueous medium.

In use, the aqueous medium is placed in a suitable container, such as a sterilized test tube. A sample to be tested is placed directly into the aqueous medium. A cotton swab saturated with lead acetate is placed just above the surface of the liquid in the tube, preferably about 1" to 1½" above the liquid surface. The swab may be held in place by first inserting it into a one-holed stopper and then closing the test tube with the stopper. This also serves to keep dust and other contaminants out of the test tube and the medium.

The medium-sample mixture is then incubated at a temperature of about 25° C.–45° C. for several hours, preferably for 20–24 hours. After the incubation period, a change in color of the medium from its original red color to a yellow color indicates acid production in the medium indicative of the presence of Salmonella. Also, a blackening of the cotton swab indicates that hydrogen sulfide gas has been produced, also indicative of Salmonella organisms in the medium. If neither of these reactions occur, the sample is deemed free of Salmonella.

Should a test sample yield positive indications of Salmonella, through either a color change in the medium or a blackening of the cotton swab, further biochemical or serological tests may be performed to positively identify the Salmonella. However, in the majority of large scale commercial applications, the most important requirement is for a dependable indication that a sample is Salmonella-free, and the present medium and method will give this indication within a 24 hour period. In this manner, the batch from which the sample was taken may be quickly cleared for further processing or released for shipment and sale.

The invention will be further described through reference to the following examples:

Example I

Thirty six samples of meat and bone meal were each divided into a control portion and a test portion. Each of the 36 control portions were placed in 10 ml. of nutrient broth and incubated for 24 hours, after which samples of each were placed in a selenite cystine broth and incubated for an additional 18 hours. A loopful of each selenite cystine broth was streaked onto brilliant green agar and incubated for 24 hours. Suspicious colonies from the brilliant green agar plates were transferred to triple sugar iron agar medium and incubated for 24 hours. The bacterial growths from these samples showing typical Salmonella reactions were then subjected to serological tests for positive identification of Salmonella.

The 36 test portions were each placed into sterilized test tubes containing 10 ml. of medium constituted as follows:

| Ingredient: | Grams/liter of $H_2O$ |
|---|---|
| Phenol red broth | 20.0 |
| D-mannitol | 10.0 |
| Bile salts | 66.0 |
| Yeast extract | 5.0 |
| Sodium phosphate (Dibasic) | 3.5 |
| Lithium chloride | 3.0 |
| Sodium deoxycholate | 1.0 |
| Sodium thiosulfate | 0.5 |
| Acriflavin | 0.05 |

A cotton swab saturated with lead acetate was placed in a stopper inserted into each tube so that the swab was approximately 1½" above the surface of the medium. The samples were incubated for 24 hours, after which they were observed for color change in the medium and blackening of the swab.

The test medium showed that 77.8% of the samples may have contained Salmonella, whereas the control samples tested for positive presence of Salmonella indicated that 41.7% of the samples actually contained Salmonella. In no instance did the test medium indicate a sample to be Salmonella-free which was shown to contain Salmonella through the conventional method used on the control samples.

Example II

Forty-eight samples of ground meat and bone meal were each divided into control portions and test portions. The control portions were tested using the conventional method as described in Example I. The test portions were tested using the test medium and swab in Example I.

The test medium indicated that 16.7% of the samples may have contained Salmonella, and the conventional method indicated that 100% of the control portions were Salmonella-free. In no case did the test medium indicate a sample to be Salmonella-free which was found to contain Salmonella by the conventional method.

Example III

Forty-seven milk product samples were each divided into control portions and test portions. The control portions were tested by the conventional method as in Example I. The test portions were tested in the test medium with cotton swab as in Example I.

The test method indicated that 19.1% of the samples may have contained Salmonella. The control method indicated that 6.4% of the samples contained Salmonella. In no instance was a sample indicated to be Salmonella-free by the test method found to contain Salmonella by the conventional method.

While the present medium and method has been described in considerable detail herein, it will be understood that variances may be introduced by those skilled in the art without departing from the spirit and scope of the invention, which is defined in the appended claims.

We claim:

1. A medium for indicating the presence of Salmonella organisms common to foodstuffs comprising in combination in an aqueous solution nutrients for Salmonella organisms, a fermentable carbohydrate, a pH indicator, sodium thiosulfate, bile salts, lithium chloride, and acriflavin.

2. A medium according to claim 1 wherein said sodium thiosulfate is present in a concentration of about 0.03–0.07% said bile salts are present in a concentration of about 0.3–1% said lithium chloride is present in a concentration of about 0.1–0.5% and said acriflavin is present in a concentration of about 0.001–0.005%.

3. A medium for indicating the presence of Salmonella organisms common to foodstuffs comprising in combination in aqueous solution the following ingredients in the approximate concentrations set forth:

| | Percent |
|---|---|
| Phenol red broth | 1.0–2.5 |
| Mannitol | 0.5–1.0 |

| | Percent |
|---|---|
| Sodium thiosulfate | 0.03–0.07 |
| Bile salts | 0.3–1.0 |
| Lithium chloride | 0.1–0.5 |
| Acriflavin | 0.001–0.005 |

4. A medium for indicating the presence of Salmonella organisms common to foodstuffs comprising in combination in aqueous solution the following ingredients in the approximate concentrations set forth:

| | Percent |
|---|---|
| Phenol red broth | 1.0–2.5 |
| Yeast extract | 0.3–0.7 |
| Mannitol | 0.5–1.0 |
| Sodium thiosulfate | 0.03–0.07 |
| Sodium phosphate (dibasic) | 0.3–0.4 |
| Bile salts | 0.3–1.0 |
| Sodium deoxycholate | 0.1–0.5 |
| Lithium chloride | 0.1–0.5 |
| Acriflavin | 0.001–0.005 |

5. A method for testing for the presence of Salmonella organisms common to foodstuffs comprising the steps of immersing a sample in an aqueous solution of the following ingredients in the approximate concentrations set forth:

| | Percent |
|---|---|
| Phenol red broth | 1.0–2.5 |
| Mannitol | 0.5–1.0 |
| Sodium thiosulfate | 0.03–0.07 |
| Bile salts | 0.3–1.0 |
| Lithium chloride | 0.1–0.5 |
| Acriflavin | 0.001–0.005 | thereafter placing a swab containing lead acetate above the surface of said solution, incubating said solution for 20–24 hours, and noting any color change occurring in said solution and said swab.

6. The method of claim 5 wherein said incubation step is carried out at a temperature of about 25–45° C.

7. A method for testing for the presence of Salmonella organisms common to foodstuffs comprising the steps of immersing a sample in an aqueous solution of the following ingredients in the approximate concentrations set forth:

| | Percent |
|---|---|
| Phenol red broth | 1.0–2.5 |
| Yeast extract | 0.3–0.7 |
| Mannitol | 0.5–1.0 |
| Sodium thiosulfate | 0.03–0.07 |
| Sodium phosphate (dibasic) | 0.3–0.4 |
| Bile salts | 0.3–1.0 |
| Sodium deoxycholate | 0.1–0.5 |
| Lithium chloride | 0.1–0.5 |
| Acriflavin | 0.001–0.005 | thereafter placing a swab containing lead acetate adjacent the surface of said solution, incubating said solution for 20–24 hours at a temperature of about 25° C.–45° C., and noting any color change occurring in said solution and said swab.

8. A method for testing for the presence of Salmonella organisms common to foodstuffs comprising the steps of immersing a sample in an aqueous solution of nutrients, a fermentable carbohydrate, a substrate capable of producing hydrogen sulfide gas in the presence of Salmonella, a pH indicator, and selective inhibitory agents including lithium chloride, acriflavin and bile salts; saturating a swab with lead acetate and placing said swab above the surface of said solution; incubating said solution for a period of at least 20 hours; and observing said solution and said swab for color change.

9. A method as set forth in claim 8 wherein said acriflavin is contained in concentration of about .001–.005 percent by weight of the solution.

10. A method as set forth in claim 8 wherein said carbohydrate is mannitol.

References Cited

"BBL Manual of Products and Laboratory Procedures," p. 121 (1968).

"Biol. Abstr." 24: 27640 (1950).

"Biol. Abstr." 3:7329 (1927).

"Chem. Abstr." 41:2117h (1947).

Levoat et al.: "Bull. Sci. Pharmacol." 40(11): 582–592 (1933).

Bailey et al.: Diagnostic Microbiology, p. 328 (1966).

"BBL Manual of Products and Laboratory Procedures," p. 160 (1968).

A. LOUIS MONACELL, Primary Examiner

M. D. HENSLEY, Assistant Examiner

U.S. Cl. X.R.

195—103.5 R